(12) United States Patent
Käbisch et al.

(10) Patent No.: US 11,767,965 B2
(45) Date of Patent: Sep. 26, 2023

(54) OPTICS FOR AN ILLUMINATION DEVICE AND ILLUMINATION DEVICE

(71) Applicant: Polycontact AG, Chur (CH)

(72) Inventors: Carsten Käbisch, Domat/Ems (CH); Thomas Zaugg, Chur (CH); Philippe Baselgia, Tamins (CH); Pablo Cavelti, Chur (CH); Johannes Eckstein, Hettlingen (CH); Markus Lipp, St. Gallen (CH)

(73) Assignee: POLYCONTACT AG, Chur (CH)

( * ) Notice: Subject to any disclaimer, the term of this patent is extended or adjusted under 35 U.S.C. 154(b) by 0 days.

(21) Appl. No.: 17/385,356

(22) Filed: Jul. 26, 2021

(65) Prior Publication Data
US 2022/0026044 A1 Jan. 27, 2022

(30) Foreign Application Priority Data
Jul. 27, 2020 (CH) .................................. 00932/20

(51) Int. Cl.
*F21V 5/04* (2006.01)
*F21Y 113/17* (2016.01)
*F21Y 115/10* (2016.01)

(52) U.S. Cl.
CPC ........... *F21V 5/045* (2013.01); *F21Y 2113/17* (2016.08); *F21Y 2115/10* (2016.08)

(58) Field of Classification Search
CPC ........ F21V 5/045; F21V 5/08; F21Y 2113/17; F21Y 2115/10; B60K 2370/332; B60K 2370/336; B60K 2370/782; B60K 35/00; B60Q 3/283; B60Q 9/00; G02B 3/005; G02B 19/0014; G02B 19/0066; G02B 3/08; F21S 43/14; F21S 43/26; F21S 8/00; G02F 1/133603; G02F 1/133607; F21W 2107/10

See application file for complete search history.

(56) References Cited

U.S. PATENT DOCUMENTS 4,566,756 A * 1/1986 Heijnemans ......... G03B 21/625
359/453
5,548,494 A * 8/1996 Blackman ................. F21L 2/00
362/183

(Continued)

FOREIGN PATENT DOCUMENTS

DE 19930461 A1 * 1/2001 ............ F21S 48/215
DE 19930461 4/2001

(Continued)

OTHER PUBLICATIONS

English Translation of KR102348900B1; Jan. 2022; Han (Year: 2022).*

(Continued)

*Primary Examiner* — Jong-Suk (James) Lee
*Assistant Examiner* — Glenn Zimmerman
(74) *Attorney, Agent, or Firm* — Finch & Maloney PLLC

(57) ABSTRACT

Optics (20) for an illumination device (1), as well as an illumination device (1) comprising such optics. The optics comprise at least one lens (30) with a light entry surface (31) and a light exit surface (32). A stepped lens structure (321), such as a Fresnel structure, is formed on the light exit surface. A recurring surface structure, such as periodically arranged prominences (311) and deepenings (321), are formed on the light entry surface (31).

24 Claims, 5 Drawing Sheets

(56) References Cited

U.S. PATENT DOCUMENTS

Figure 1:
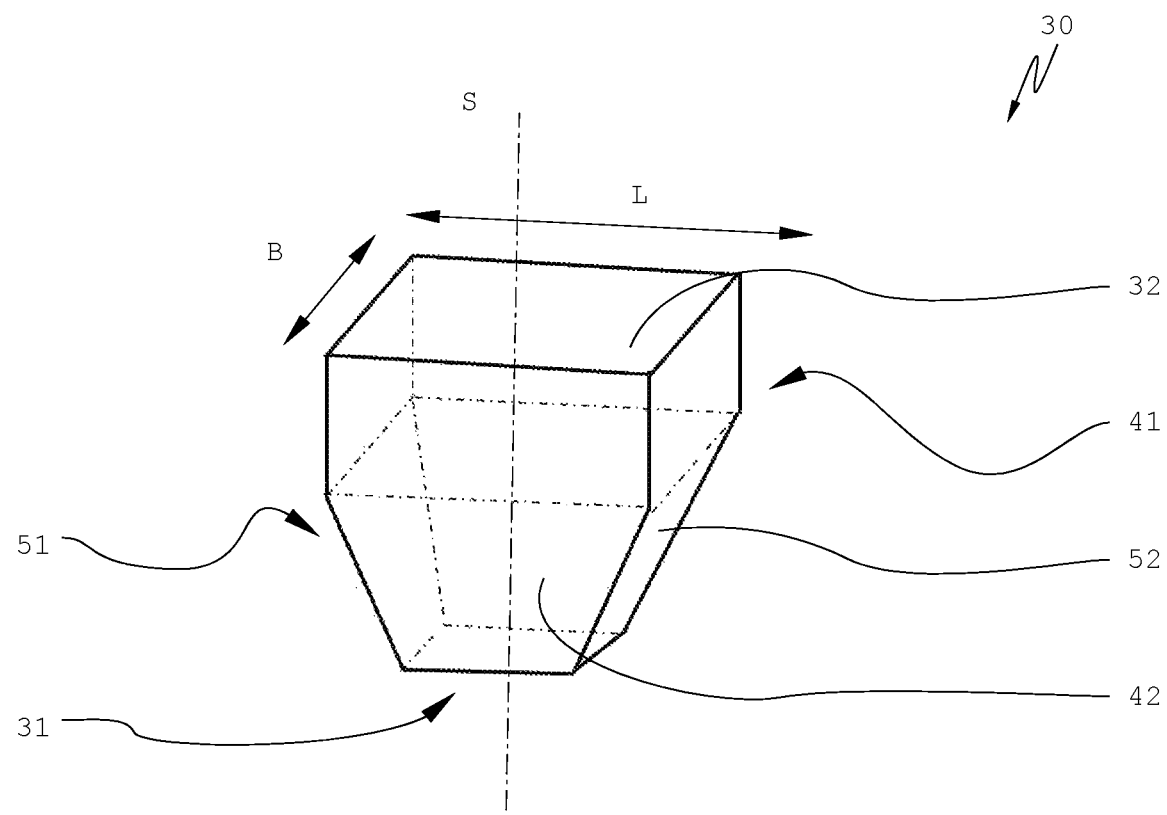

| | | | |
|---|---|---|---|
| 5,676,453 A | 10/1997 | Parkyn, Jr. et al. | |
| 9,574,734 B2* | 2/2017 | Sousek | F21S 43/249 |
| 9,677,737 B1 | 6/2017 | Sayers | |
| 10,584,836 B1* | 3/2020 | Li | F21S 4/28 |
| 10,920,940 B1* | 2/2021 | Bryan | F21V 5/04 |
| 2003/0147244 A1* | 8/2003 | Tenmyo | F21V 5/045 |
| | | | 362/339 |
| 2008/0130282 A1* | 6/2008 | Negley | F21K 9/00 |
| | | | 362/246 |
| 2011/0127546 A1* | 6/2011 | Jaus | H01L 31/054 |
| | | | 257/432 |
| 2012/0119221 A1* | 5/2012 | Negley | H01L 33/58 |
| | | | 257/76 |
| 2013/0021815 A1* | 1/2013 | Koizumi | F21S 43/14 |
| | | | 362/511 |
| 2013/0100662 A1* | 4/2013 | Lin | F21V 29/763 |
| | | | 362/235 |
| 2014/0071703 A1* | 3/2014 | Motomura | F21S 43/40 |
| | | | 362/511 |
| 2015/0003094 A1 | 1/2015 | Gebauer et al. | |
| 2015/0346415 A1* | 12/2015 | Liu | G02B 6/0061 |
| | | | 362/611 |
| 2016/0116666 A1* | 4/2016 | Sato | G02B 6/0046 |
| | | | 362/509 |
| 2018/0206300 A1* | 7/2018 | Farnsworth | H05B 47/19 |
| 2019/0346110 A1* | 11/2019 | Yin | G02B 19/0028 |
| 2021/0404621 A1* | 12/2021 | Han | F21S 41/265 |

FOREIGN PATENT DOCUMENTS

| | | | | |
|---|---|---|---|---|
| DE | 102011085314 | | 4/2013 | |
| DE | 102016109647 A1 | * | 11/2017 | F21V 5/045 |
| EP | 3168657 A1 | * | 5/2017 | F21S 43/239 |
| JP | 3341223 B2 | * | 11/2002 | |
| JP | 5510038 B2 | * | 6/2014 | |
| JP | 2017027823 A | * | 2/2017 | F21S 43/14 |
| KR | 102348900 B1 | * | 1/2022 | |

OTHER PUBLICATIONS

English Translation of JP3341223B2; Lens Sheet For Transmission Screen; Honda et al. (Year: 2002).*
English Translation of JP-5510038-B2, Fujita (Year: 2014).*
Swiss Search Report Corresponding to 9322020 dated Dec. 17, 2020.

* cited by examiner

OPTICS FOR AN ILLUMINATION DEVICE AND ILLUMINATION DEVICE

The present invention relates to optics for an illumination device as well as to an illumination device comprising optics, according to the preamble of the independent patent claims.

A multitude of different optics for illumination devices is known from the state of the art. Typically, a light beam of a light source is to be deflected or shaped in a specific way and manner by way of the optics. Light sources such as for example LEDs typically have a small, extended, illuminating surface. Depending on the type, the light as a rule is emitted into a semi-space in a rotationally symmetrical manner. If one illuminates perpendicularly onto a plane surface with an LED, then typically the illumination density is greatest in the centre and reduces radially with regard to the central beam path. However, this light distribution is often not desired and optics which from this light source attempt to create a uniformly irradiating light surface and/or to distribute the emitted light uniformly along a linear extension are provided.

For example, a vehicle light which comprises optics with a two-part lens is known from DE 199 30 461. The lens comprises a light entry surface and a light exit surface. The light exit surface is designed as a Fresnel lens. The light entry surface is designed as a lens section which comprises a surface which is designed in a cylindrical manner. Starting from a point-shaped light source, although emitting characteristics which comprise essentially parallelised light beans can be achieved with this arrangement, this arrangement however has an inhomogeneous distribution of the light density, thus of the light intensity. Coming from the light source, the light intensity centrally in the beam path is significantly higher that radially distanced thereto.

Further optics are known from DE 10 2011 085 314 B3, with which optics one attempts to uniformly distribute the light intensity in a linear extension coming from an almost point-like light source, for example an LED. Herein, several lenses which are arranged in series are provided per light source. Herein, the first lens has a rotationally symmetrical cross section with a light exit surface which is obtained by the rotation of an ellipse, and a light entry surface which is designed in a cylindrical manner. The second lens which is assigned to the light source comprises an essentially plane entry surface and a light exit surface which corresponds to a section of an ellipse. A diffuser can be arranged subsequently to this combination of lenses. The optics of DE 10 2011 085 314 B3 comprise a multitude of individual elements which must be arranged to one another with a high precision and in particular to the light source with a high precision.

As already explained beforehand, LEDs when considered more precisely are not point-like emitters, as for example laser diodes, but emit light from a surface.

It is therefore the object of the invention to remedy at least one or more disadvantages of the state of the art. In particular, optics which permit the scattering of the light beam of a light source onto a reference surface in a uniform manner and in particular with the same light intensity are to be provided, wherein in particular the optics are simple in assembly and the arrangement of the individual components to one another is insensitive in large ranges with respect to tolerance fluctuations or positional inaccuracies.

This object is achieved by the devices which are defined in the independent patent claims. Further embodiments result from the dependent patent claims.

Optics according to the invention for an illumination device comprise at least one optical element, hereinafter denoted as a lens, with a light entry surface and a light exit surface. A stepped lens, in particular a Fresnel structure is formed on the light exit surface.

The Fresnel structure is characterised in that a lens with a focal point is divided into annular regions and these regions are each reduced in their thickness and thus a stepped lens with a small construction height is formed. All these annular regions have a common focal point.

Concerning the present stepped lens structure however one can envisage each of the annular regions, thus each of the steps comprising a separate focal point, wherein these focal points in particular are arranged along the light entry surface which is to say in or close to the plane of the light entry surface.

This permits the alignment of the light beams on the stepped lens which are not only emitted from one point, but from a light source which is extended or elongated or extensive, such as an LED.

Herein, it is conceivable not to design the stepped lens with annular regions, but starting from a centre of the lens with regions which are arranged in parallel, thus with parallel individual steps.

Alternatively, the individual steps can also be designed as annular regions whose middle point is displaced to the centre of the lens.

The centre of the lens is defined by the geometric middle of the lens and is congruent to the central beam path. This is defined by the geometric middle of the light source or by the beam path of an imagined point light source which replaces the light source.

The steps can have an essentially triangular cross section close to the central beam path, wherein this cross section comprises a flank which faces the central beam path and a flank which is away from the central beam path. An angle of the distant flank becomes steeper to almost perpendicular with an increasing distance to the central beam path. Beams which are incident onto this flank in a flat manner from within the lens body are reflected within the lens body and are herein aligned in the direction of the central beam path. Herein, one can envisage the triangular cross section changing into a trapezoidal cross section with an increasing distance to the central beam path. In other words, the tip of the triangle is flattened. Due to the flattening of the tip, the beams which are reflected at the flanks of the steps can exit out of the lens in an uninhibited manner almost perpendicularly, thus in the direction of the central beams path.

Additionally, one could envisage the height of the steps changing, so that notches between the steps extend more deeply into the lens body with an increasing distance to the central beam path. This enlarges the surface of the flanks, at which the beams can be reflected.

A surface structure of recurring, in particular periodically arranged prominences and deepenings are formed on the light entry surface. These prominences and deepenings can each be similar to one another. Preferably they are each designed equally. It is self-evident that the light entry surface is formed with respect to an individual light source and thus a multitude of such prominences and deepenings are formed per beam bundle which is to be beamed in.

Preferably therefore, at least one prominence and one deepening are provided per light source, wherein it is merely the region which actually emits light, thus concerning LEDs the light-emitting chip which is considered as a light source. Preferably however, at least two, preferably three, in particular more than five alternating prominences and deepenings are provided per light source.

It is self-evident that the surface structure can comprise additional further prominences and deepenings also beyond the dimension of the light-emitting chip.

The surface structure extends over a two-dimensional region. This region can of course also extend along a plane which is arcuate in space, for example a section of a spherical surface.

This region with the surface structure preferably has no interruption. In other words, the surface structure of the light entry surface is continuous.

The rowing of prominences and deepenings defines a length of the region, an extension along the deepnding or prominences defines a width of the region. The directions of the length and width correspond to respective directions of the lens, and thus the prominences and deepenings extend transversely to the length of the lens.

One of these regions is assigned to each light source on designated use.

On account of the design as a recurring surface structure, the scattered-in light is refracted and/or scattered into different directions independently of its specific point of incidence into the light entry surface. A point-accurate placing of the lens with regard to the centre of the beam path of the light source is not necessary, in particular if the region with the surface structure exceeds the length of the LED chip.

The design as a recurring structure, in particular as a recurring structure of similar and/or equal elements, ensures that the beamed-in light is likewise recurringly refracted in an equal or similar manner. A positional difference of the light source relative to the recurring structure has no noticeable influence on the light distribution after the structure. This renders the complex arrangement robust with regard to tolerances.

The beam path is defined along the direction from the light entry surface to the light exist surface. This is essentially at right angles to the light entry surface. The light entry surface thus lies essentially on a plane which is at right angles to the beam path. Accordingly, the light exit surface likewise lies on a plane which is essentially at right angles to the beam path and is consequently distanced essentially parallel to the plane of the light entry surface. Concerning these definitions of the light entry surface and/or the light exit surface, in each case it is the geometric centre of the respective structures which are arranged on these surfaces which are taken into account. This is also the case if for example the light exit surface has a slight inclination.

The light entry surface as well as the light exit surface each has a width and a length. The length of the light exit surface preferably corresponds at least to threefold the width of the light exit surface.

Concerning the light entry surface, the length can correspond essentially to the width, and the length of the light entry surface is preferably more than 1.5 times as large as the width of the light entry surface.

A lens body extends between the light entry surface and the light exit surface. This at one side terminates with the light exit surface, and at the other side with the light entry surface. Herein, the lens body in the region of the light entry surface connecting in the longitudinal direction of the light entry surface at both sides can be designed larger, in other words longer, than the light entry surface or the region with the surface structure. The lens body can be formed without a surface structure in these extensions.

Such a design permits the radiation which is scattered in the lens body to have sufficient space in the longitudinal direction on both sides of the surface structure, in order to be reflected at delimitation walls of the lens body.

One can envisage the prominences and/or deepenings each being arranged parallel to one another.

A parallel arrangement here is understood as a definition in the classical sense, for example if two straight lines are parallel, but this expression here also includes parallel designs of curved shapes, this for example concentrically arranged circle sections and/or freely shaped lines which are arranged at a uniform distance.

In particular, in the case of an arrangement in the context of straight lines, this permits the design of a surface structure which is more tolerant with regard to the position with respect to the centre of the beam path of the light source.

The promineinces and deepenings are preferably arranged in a uniformly distanced manner. The distance from prominence to prominence and/or deepening to deepening is preferable less than 1 mm, in particular less than 500 µm and preferably less than 100 µm.

In the case of an LED as a light source, the distance in particular is selected as a function of the microstructure of the LED. Typical microstructures of LEDs are 25 µm to 500 µm. Herein, the distance is preferably smaller than the longest extension of the respective microstructure.

The smaller the respective structures are in comparison to the microstructure of the LED chip, thus to the dimension of the LED chip, the less sensitive is the position of the entry surface with respect to the centre of the beam path of the light source, since several of the recurring structures are simultaneously subjected to the light source.

The prominences and deepenings can have a distance from a highest point of the prominence to the deepest point of the adjacent deepening of less than 1 mm. In particular this distance is less than 500 µm and preferably less than 100 µm.

The system becomes less sensitive to tolerances in the case of a low height. The height of the prominences and deepenings preferably lies in the region of the width of the prominences and deepenings. Herein, one can envisage the height merely being 90%, preferably merely 80% of the width, in particular merely 70% of the width.

The prominences and deepenings are preferably designed in a sinusoidal manner and in particular together form a sinusoidal or co-sinusoidal course. The sinusoidal course can be extended or compressed in its width or height. Generally, it can be said that a compressed sine has steeper side flanks and hence the incident light beams are refracted to a greater extent and herewith the incident light is further fanned out.

Such a design permits a multitude of beams which are incident onto the light entry surface to be deflected in the direction of the light exit surface and in particular distributed behind the light entry surface.

The light entry surface and the light exit surface are preferably connected to one another by two walls. These walls are preferably distanced uniformly to one another and in particular parallel. This definition however does not exclude these two surfaces being able to have a taper which is inherent of manufacture, for example for the ability to be removed from the mould in the case of injection moulding. Thus for example a taper of up to 5° can be envisaged. These walls extend parallel to the beam path and in the direction of the longitudinal extension of the light exit surface. These walls herewith connect the longitudinal sides of the light entry surface and the light exit surface. These walls therefore provide delimitation walls of the lens body.

By way of the connecting of the light entry surface and the light exist surface by suitable walls, an optical element can be provided between the light entry surface and the light exit surface, said element representing a boundary surface of two materials. Herein, at least a part of the light which is incident onto this boundary surface is reflected and thus remains within the lens body.

The lens body itself is preferably designed in a homogeneous manner. In particular, no further boundary surfaces are provided in the direct connection between the light entry surface and the light exit surface.

The light entry surface and the light exit surface are boundary surfaces of the optics which are directed outwards, thus towards the light source or to the illuminated object.

The lens body is preferably designed as one piece with a respective light entry surface and a respective light exit surface and in particular comprises no cavities.

The distance of the walls is typically given by the existing construction space. It preferably corresponds to less than a quarter of the distance of the light entry surface to the light exit surface, however at least to a tenth of this distance. For measuring the distance, the light entry surface and the light exit surface are considered on the basis of their respective geometric middle.

These maximal and minimal values ensure that the light beams which are incident upon these walls are reflected and are accordingly led further from the light entry surface to the light exit surface in a relatively direct manner.

These walls preferably have a degree of reflection of larger than 90%, in particular larger than 96%.

By way of this, the losses due to incorrectly emitted radiation are minimised.

Furthermore, one can envisage these walls at least over a part region of their extension from the light entry surface to the light exist surface being connected to one another via two walls which are arranged in a diverging manner from the light entry surface to the light exit surface. These walls therefore provide further delimitations walls of the lens body.

On account of the provision of these diverging walls, a further optical element can be provided between the light entry surface and the light exit surface, said further element representing a boundary surface of two materials. Herein, at least a part of the light which is incident upon this boundary surface is reflected and thus remains within the lens body.

The angle which is enclosed by these diverging walls is preferably less than 90°, however at least 30°, preferably at least 45°. These diverging walls are preferably arranged symmetrically to be beam path.

These maximal and minimal values ensure that the light beams which are incident upon these walls are reflected and accordingly are led further from the light entry surface to the light exit surface in a relatively direct manner.

Preferably, these walls have a degree of reflection of greater than 90°, in particular greater than 96%.

By way of this, the losses due to incorrectly emitted radiation are minimised.

A scatter surface can be provided on these walls for increasing the homogenisation of the beamed-in light.

One can further envisage the light entry surface having a bulging or deepening which dominates the surface structure.

This permits specific emitting characteristics of the light source to be taken into account. In particular, given a deepening of the light entry surface, these can be arranged at least regionally around the light source.

The optics can comprise at least two, in particular three lenses which in particular are arranged successively along the uniformly distanced walls. In other words the lenses are arranged one after the other in a linear manner, in particular in the direction of the longitudinal extension of the light entry surfaces, or of the light exit surfaces. The lenses thus form a linear array.

It is self-evident that this array can also be formed along an arcuate curve.

This permits the light to be superimposed in particular in certain regions of the respective lenses, which is to say in the region of the broad sides of the light entry surfaces and to compensate a possible drop of the light intensity in these regions. The rowing of several lenses specifically permits the light to be scattered from the first lens to into the end region of the second lens and vice versa. Accordingly, the light intensity in these regions can be increased by way of superimposing two light sources.

Herein, one can envisage the stepped lens structure in these regions, in which according to expectation the light is incident from two light sources, being designed in a manner such that several angles of incidence are taken into account. For example, the flank which is away from the central beam path can be aligned onto the first lens and the flank which faces the beam path can be aligned onto the adjacent lens.

Herein, one can envisage the at least two lenses being arranged at a distance to one another, said distance corresponding at least two half the distance from the light entry surface to the light exit surface and in particular maximally to threefold this distance.

These maximal values ensure that on the one hand no too great a superposition and on the other hand no too weak a superposition takes place in the respective end regions of the lenses. Herewith, a relatively homogenous light intensity can be achieved in the region of the light exit surface.

It would likewise be conceivable to arrange several of these linear arrays next to one another, thus in the direction of the width of light exit surface, in order to thus obtain a two-dimensional array. This permits the illumination of a surface and/or the representation of patterns.

It is to be understood that such a linear array comprises a first lens and a last lens as end lenses. In the case of only two lenses, no further lenses are arranged between the end lenses, and in the case of an arrangement of more than two lenses, one or more further lenses are arranged between these end lenses. The first and the second lens can have a configuration which differs from the configuration of the lenses which lie therebetween, since these two end lenses each have an end region which is not superimposed with a second end region of a further lens. Thus for example it is conceivable for example for the end lenses to comprise diverging walls with different angles. In other words, the end-lens with a non-covered or covered end region can comprise a diverging wall which is steep and herewith provides an end region which coming from the beam path is designed in a shortened manner.

One can therefore envisage the stepped lens structure being provided with steeper flanks towards the end region, in contrast to a lens which is not an end lens, or the focal points of the individual regions lying closer to one another. In contrast to the lenses which are not end lenses, merely a single light source needs to be taken into account in this end region.

In a preferred embodiment, the at least two lenses are designed in a single-piece manner. Herein, they can be connected to one another over at least a quarter of their extension in the direction of the beam path.

This permits the simple and inexpensive manufacture of a linear array of lenses, wherein one can make do without a complicated positioning of the individual lens amongst one another on assembly.

The optics can comprise one or more fastening elements. Herein, at least one fastening element can be assigned to each lens, wherein in particular in the case of several lenses this is arranged between the lenses.

The fastening element permits the lens to be fastened to a respective component.

The influence of the fastening element on the optical characteristics of the lens is minimised by way of the arrangement of the fastening element between the lenses.

Herein, in particular in the case of an array, one can envisage a fastening element which fixes the array with respect to three axes being provided centrally. This fastening element is preferably arranged centrally, which is to say in the middle of the array. The further fastening elements can be designed in a manner such that an extension of the array to both sides, for example due to temperature differences, can be compensated. In other words, a movement of the non-central fastening elements in the longitudinal direction of the array is made possible.

A diffuser can be arranged subsequently to the light exit surface. In other words, the optics apart from the lens or the several lenses comprises a diffuser. Herein, one can envisage the diffuser extending over the two or more lenses as a single component.

The provision of a diffuser permits the light to be scattered further and/or diffuse emission characteristics to be given to the light. Furthermore, a viewing angle independence of the illuminated surface is ensured by the diffuser.

The diffuser can have Lambert-shaped scatter characteristics. Herein, a forward scattering which for example is Gaussian can be included.

This permits a uniform scattering and a uniformly bright appearance of the surface of the diffuser.

At the entry side of the light, the diffuser can likewise additionally comprise a structure in the form of a stepped lens, in order to direct the incident radiation into a desired shape.

The diffuser can be arranged in diffuser housing. Herein, in particular one can envisage the at least one lens being fastened to the diffuser housing.

This on the one hand permits a positionally accurate fastening of the lens with respect to the diffuser and on the other hand a shielding or covering of the lens can be provided by the diffuser housing, wherein the diffuser housing can be designed as a reflector which scatters in white, in particular in regions, on which the lens bears, and/or the diffuser housing covers the lens. This improves the scattering and the uniform distribution of the light within the lens body.

Herein, one can envisage the lens being fastened to the diffuser housing by the fastening elements.

A further aspect of the invention relates to an illumination device comprising one or more optics as described here, as well as a light source which in particular is arranged directly adjacently to the light entry surface. In other words, the light entry surface faces the illumination source.

This permits the simple provision of a system of optics and light source which are matched to one another.

The illumination device as a light source preferably comprises a light module with one or more LEDs which are arranged thereon, wherein the one or more LEDS can each provide a light source.

This permits the provision of a system which is matched to one another with respect to all components.

Herein, one can envisage an LED as a light source being assigned to each lens.

Each lens is preferably designed as an RGB-LED.

Accordingly, the illumination device can be operated in different colours and colour combinations.

The lens can be manufactured of polyamide, for example PA12, PA1010, PA610 or PA612, known under the trademark names Grilamid, and preferably have a degree of transmission of more than 90%.

Figure 2:
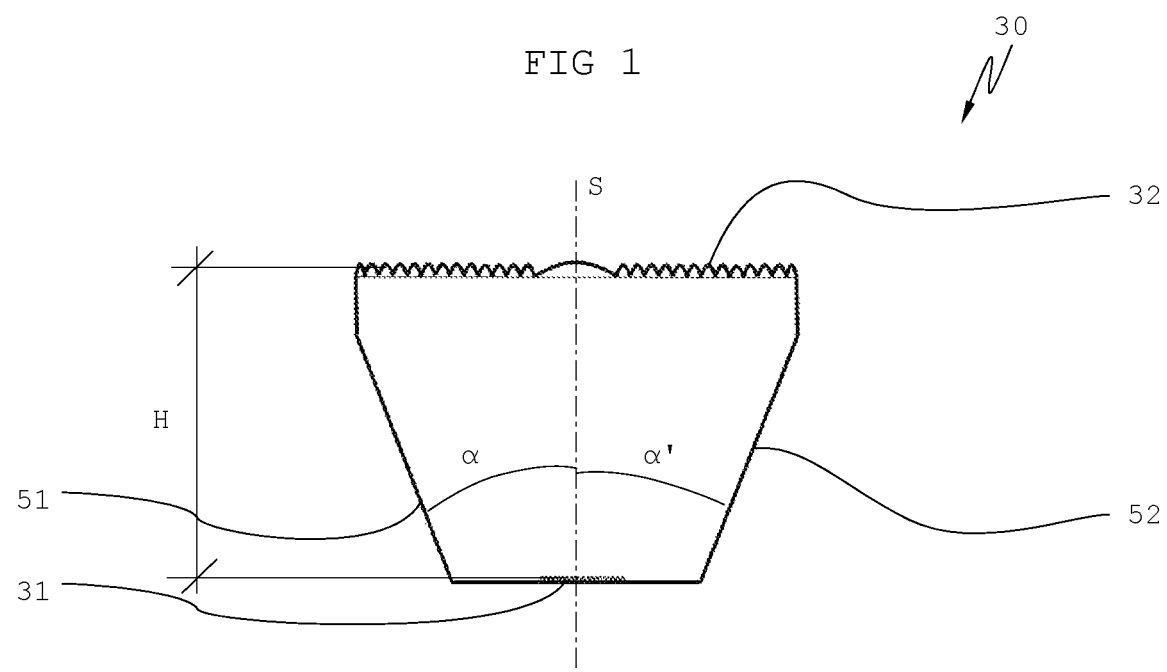
Figure 3:
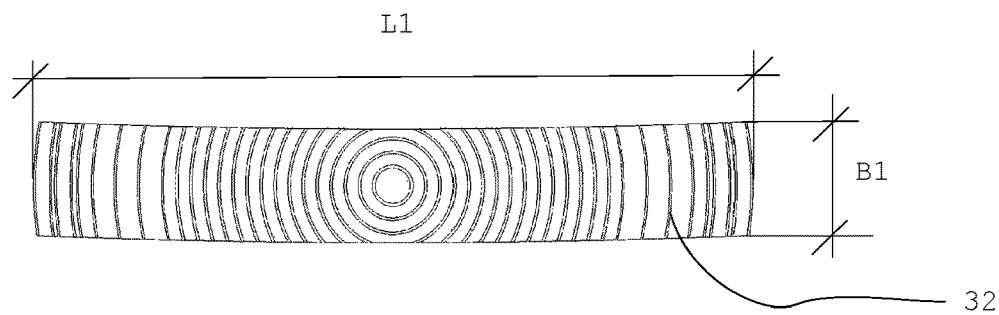
Figure 4:
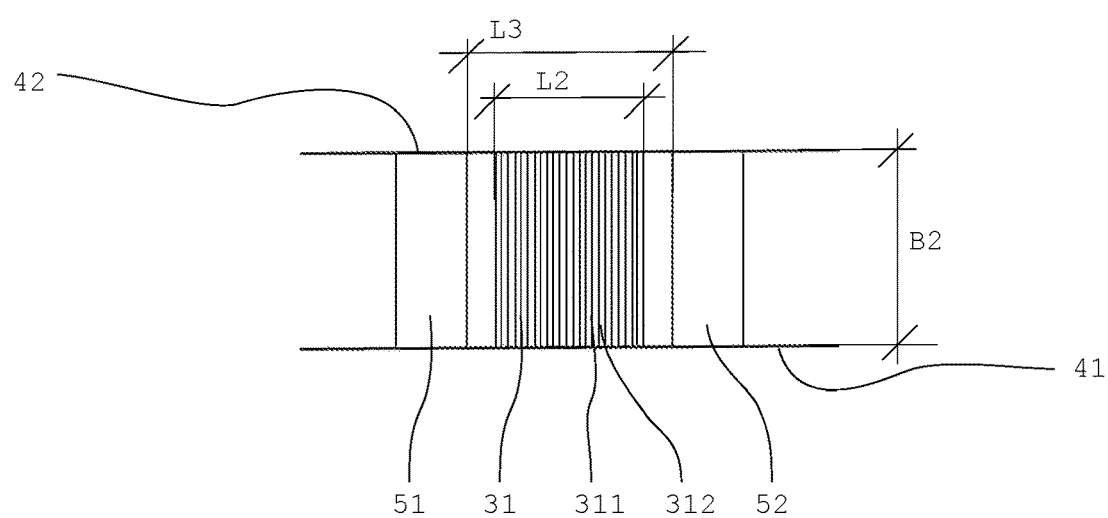
Figure 5:
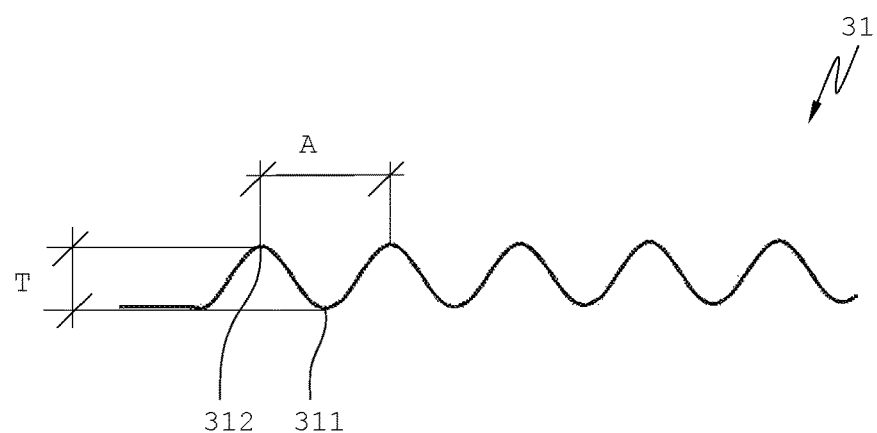
Figure 6:
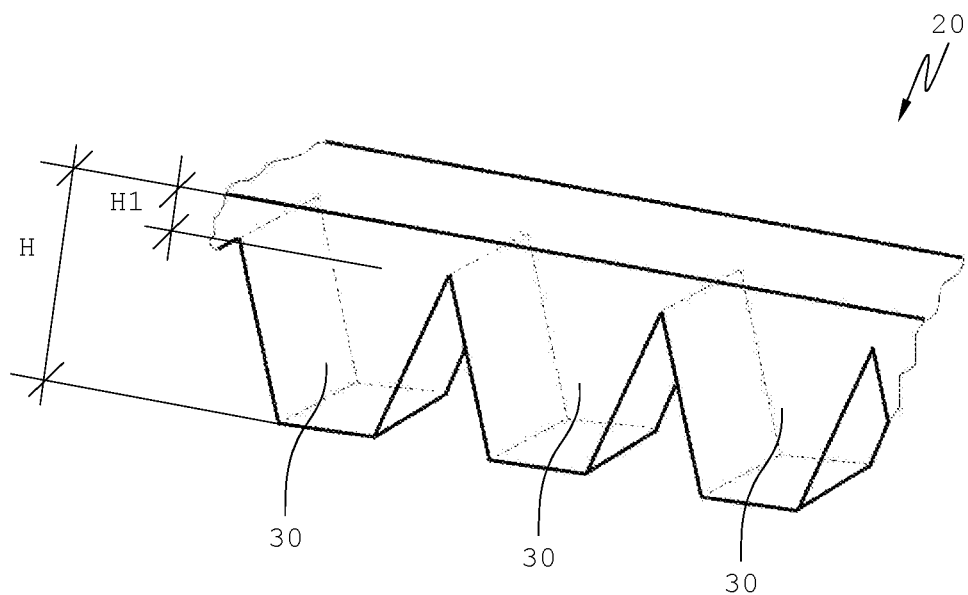
Figure 7:
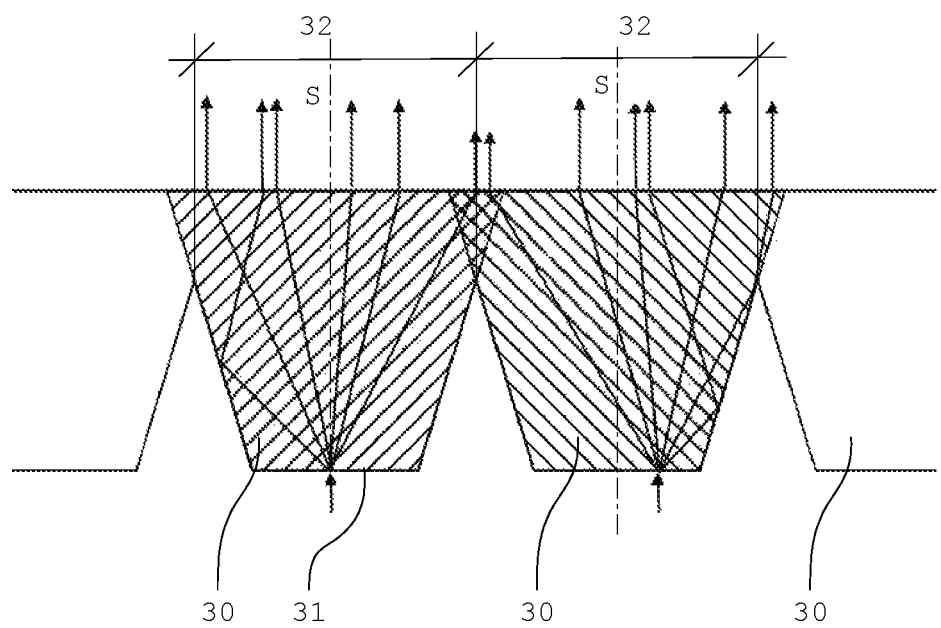
Figure 8:
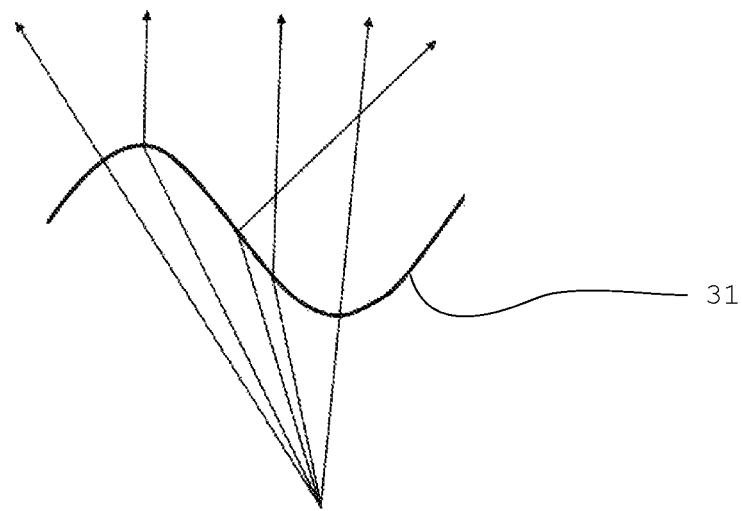
Figure 9:
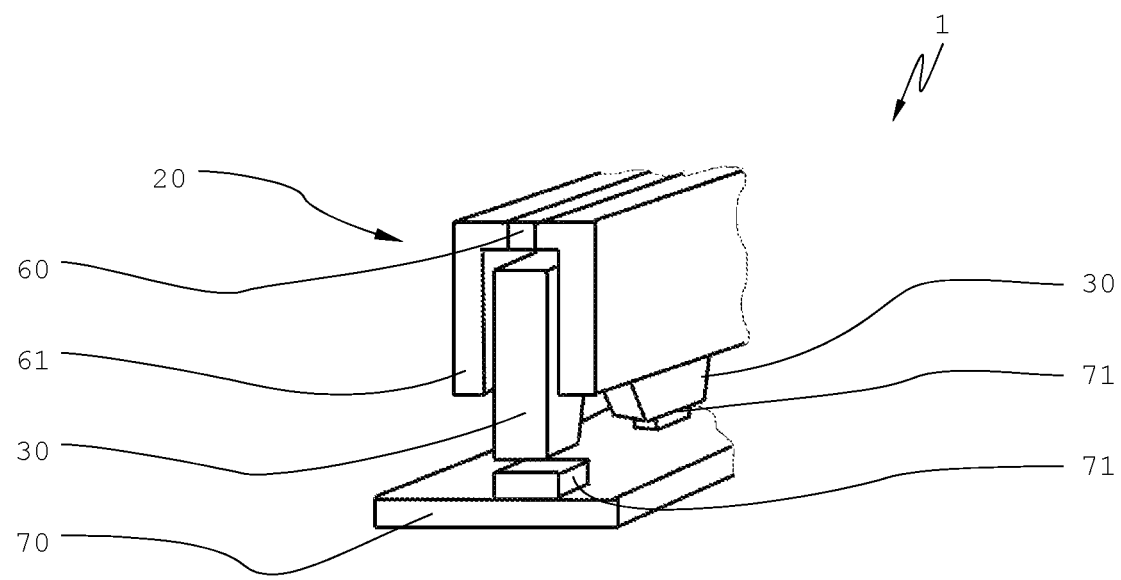
Figure 10:
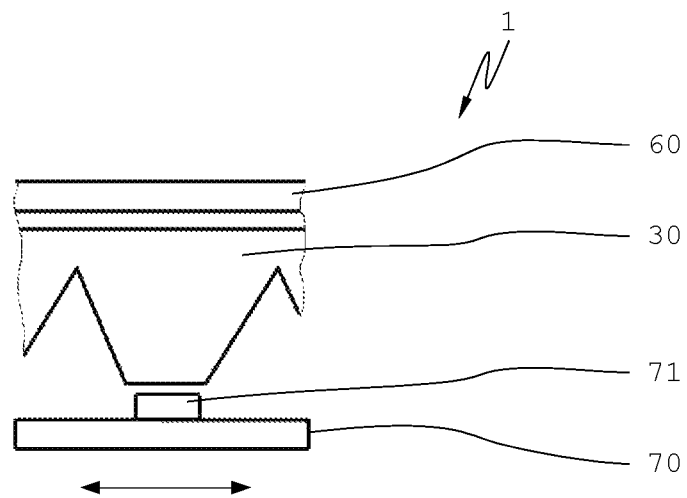
Figure 11:
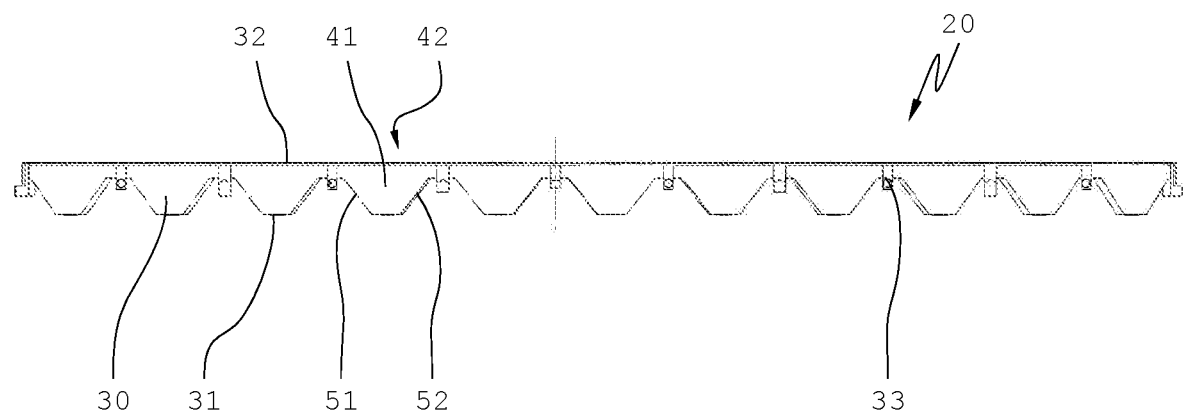

One embodiment is explained hereinafter by way of schematic figures. There are shown in:

FIG. 1: a perspective representation of a lens;
FIG. 2: a sectioned view of the lens of FIG. 1;
FIG. 3: a view upon the lens exit surface of FIG. 1;
FIG. 4: a view upon the lens entry surface of FIG. 1;
FIG. 5: a sectioned view through the light entry surface of FIG. 4;
FIG. 6: a perspective view of an array of lenses;
FIG. 7: a lateral view of the array of FIG. 6;
FIG. 8: a detailed view of FIG. 4;
FIG. 9: a perspective view of a section of an illumination device;
FIG. 10: a lateral view of the illumination device of FIG. 9;
FIG. 11: a lateral view of an array of lenses.

FIG. 1 shows a perspective view of a lens 30 of optics 20. It is to be understood that the lens 30 itself can already represent the optics 20, but preferably yet further optical elements such as diffusers can yet also be taken into account as part of the optics 20 (for this see FIG. 9 and following). The lens 30 comprises a light entry surface 31 and a light exit surface 32. These are connected to one another via a lens body which is not described in more detail. Herein, it is conceivable for the lens body to be constructed in a multi-part manner, but a single-part construction is preferred. The lens body here comprises two uniformly distanced walls 41 and 42 which connect the light entry surface 31 to the light exit surface 32. These two walls 41, 42 are connected to one another by way of two diverging walls 51 and 52. The lens 30 has a length L and a width B which are defined by the longitudinal extension L1 and width B1 (see FIG. 3) of the light exit surface 32. The beam path S extends from the light entry surface 31 to the light exit surface 32. The light entry surface 31 and the light exit surface 32 are arranged essentially at right angles with regard to this beam path S.

The essentially uniformly distanced walls 41 and 42 have a reflection degree of 96%. The diverging walls 51 and 52 also have a degree of reflection of 96%. The reflection degrees are however preferably higher.

A surface structure which is not shown in more detail here and which here is formed from sinusoidal prominences and deepenings (see FIGS. 4 and 5) are formed on the light entry surface 31.

A stepped lens structure which is not shown in more detail in this figure is formed on the light exit surface 32 (see FIGS. 2 and 3).

FIG. 2 shows a sectioned view in the direction of the length L through the beam path S of the lens of FIG. 1. In FIG. 2 it is evident that the lens 30 is designed essentially centrally symmetrically to the beam path S. The diverging walls 51 and 52 are arranged at an angle α and α' to one another at both sides of the beam path S. Here, the angle α corresponds to the angle α'. The angles α and α' together are 77°.

The surface structure of the light exit surface 32 is clearly recognisable. This surface structure is designed essentially accordingly the principle of a Fresnel structure but in a manner such that the individual scatter lenses do not meet at a single focal point but in a manner such that the focal points are distributed at least partly along the length L2 (see FIG. 4).

The surface structure of the light entry surface 31 is practically not visible in FIG. 2 on account of its smaller size.

Likewise drawn in FIG. 2 is the height H of the lens 30 which is defined by the distance of the respective geometrical middles of the light entry surface 31 and the light exit surface 32.

FIG. 3 sows a plan view upon the light exit surface 32. What is clearly recognisable in FIG. 3 is the essentially circular arrangement of the individual stepped lenses around the beam path S (for this see FIG. 1). The light exit surface 32 and hence the structure which is arranged thereon has a length L1 and a width B1. The length L1 here corresponds approx. to tenfold the width B1.

FIG. 4 shows a view upon the light entry surface 31. The light entry surface 31 has a width B2 and a length L3 which are defined according to the length L and the width B of the lens 30 (for this see FIG. 1). Prominences 311 and deepenings 312 which extends essentially from the first wall 41 to the second wall 42 are formed on the light entry surface 31 in a region with a surface structure. The prominences 311 and deepenings 312 form a uniform surface structure. The lens body extends over this region in the plane of the light entry surface 31 on both sides of this region of the light entry surface 31. Here, the lens body has a length L3 which is larger than the length L2 of the region. This widening subsequently merges into the diverging wall 51 or into the diverging wall 52.

FIG. 5 shows a sectioned view through the surface structure of FIG. 4 along the beam path S in the direction of the length L (see FIG. 1). The surface structure is formed from sinusoidal deepenings 312 and sinusoidal prominences 311. These deepenings 312 and prominences 311 are arranged in a periodic manner at a distance A of 135 μm. The highest point of the prominence 311 to the deepest point of the deepening 312 has a distance T which is 50 μm.

FIG. 6 shows a perspective and schematic view of a detail of an array of several lenses 30 which together form simple optics 20. The transition between the individual lenses 30 is only represented in a simplified manner. The lenses 30 are connected to one another as one piece at their broad sides (see FIG. 1). The connection extends over a height H1 which corresponds to a quarter of the height H. This connection can however be designed for example as a web, on which likewise fastening elements for fastening the lens or the array are arranged (see for example FIG. 11).

FIG. 7 show a lateral view of a detail of the array of FIG. 6. A light beam is drawn in at the light entry surface 31 for a first lens 30 (shown at the left in FIG. 7). This is congruent with the central beam path S. This individual light beam is refracted at the light entry surface 31 by the surface structure and is fanned out in a wide manner and is distributed within the lens body. Such a distribution is also to be found in the second represented lens 30 (show at the right in FIG. 7). The light beam of the second lens 30 is now arranged offset with respect to the central beam path S. Here, it can be clearly recognised that on the one hand the positioning of a light source to the central beam path is of less relevance, and on the other hand light which is fed in edge regions is also widely fanned out. The individual light beams or light bundles after the passage of the light entry surfaces 31 have an essentially fan-like distribution. This is represented as a whole by hatchings, in other words the lens body is flooded with light in large regions.

Concerning these two lenses 30, the associated light exit surface 32 is likewise drawn in. In the region of the connection of these two lenses 30, it is likewise evident that the respective light bundles overlap, represented by the overlapping of the hatchings. In other words a light bundle of a light source, represented by an arrow at the light entry surface 31, of a first lens 30 beams to into the light exit surface of a second lens 30 and vice versa. Thus the light density is increased in these overlapping regions and a weakening of the light intensity which typically occurs at a radial distance to the beam path is compensated. The uniform light intensity or light density by way of example is represented by two shorter light beams which are drawn in the region of the overlapping, which however have a higher density.

FIG. 8 shows a detailed view of the surface structure of FIG. 4. Represented schematically are individual light beams of the light source which are refracted at the surface structure 31. A fanning-out takes place by way of the continuous change of the angle of incidence of a light beam on the surface of the surface structure, relative to the light source.

FIG. 9 shows a perspective view of a section of an illumination device 1. The illumination device 1 comprises an array of several lenses 30 and a diffuser 60. The array of the lenses 30 together with the diffuser 60 forms optics 20. The diffuser 60 is fastened in a diffuser housing 61. The array of the lenses 30 here is fastened to the diffuser housing 61 by way of fastening elements which are not shown here in more detail. A light module 70, on which several LEDs 71 are arranged is assigned to these optics 20. The light module 70 comprises one LED 71 per lens 30. The light module 70 in turn is connected to the diffuser housing 61 by way of fastening means which are not represented in detail. The illumination device 1 can be arranged for example in a steering wheel of a vehicle. By way of such an illumination device 1, certain information can be conveyed to the user and in the present case to the driver of the vehicle. For example, the turning of the vehicle can be optically represented. By way of a suitable activation of the light module 70, circumstances, for example that the vehicle is presently being overtaken by a further vehicle can be also possibly conveyed. In particular, given the provision of the individual LEDs as RGB LEDS, additionally with a representation for example via the colours red or green one can indicate to the driver whether an overtaking of another vehicle is presently possible or not, or whether for example an obstacle is located to the left or right next to the vehicle.

FIG. 10 shows a lateral view of the illumination device 1 of FIG. 9. An individual LED 71 is represented on the light module 70. The LED radiates into the lens 30, wherein a diffuser 60 is arranged subsequently to this. As is evident from FIG. 10, the LED 71 can be displaced in the arrow direction relative to the lens 30 without a noticeable change of the emitted light being effected at the exit of the diffuser 60. On account of a linear design of the surface structure of the light entry surface 31 (for this see FIG. 4) the LED 71 likewise in the representation according to FIG. 10 can be moved in the direction of the plane of the sheet, thus into the sheet or out of the sheet without having a significant influence on the light which is emitted from the diffuser 60.

FIG. 11 shows a lateral view of the array of FIG. 6, wherein more details are evident in this representation compared to the representation in FIG. 6. The optics 20 comprise several lenses 30, wherein for the purpose of a better overview not all elements are provided with reference numerals.

The optics comprise several fastening elements 33, wherein these fastening elements 33 are each arranged at the transition between two lenses 30.

The transition between the individual lenses 30 is shown here in a detailed manner. The lenses 30 at their broad sides (see FIG. 1) are connected to one another as one piece. The connection is designed as a web, on which the fastening elements 33 are arranged for fastening the array of lenses 30.

Each of the lenses 30 comprises a light entry surface 31 and a light exit surface 32. These are designed according to the light entry surfaces 31 and light exit surfaces 32 as are described with regard to the remaining figures. These light entry surfaces 31 and light exit surfaces 32 are essentially each arranged in a common plane and are connected to one another via the walls 41 and 42 which are essentially uniformly distanced to one another. Furthermore, each lens comprises two diverging walls 51 and 52 which each extend up to one of the webs which connect the lenses 30. The lenses 30, seen from a plan view, are arranged on a circular arc, so that they can be arranged for example in a steering wheel.

The invention claimed is:

1. An optics for an illumination device comprising:
at least one lens with a light entry surface, and
a light exit surface, and
a plurality of fastening elements, one fastening element of the plurality of fastening elements fixes the optics with respect to three axes, wherein the remaining fastening elements of the plurality of fastening elements are designed in such a manner that the remaining fastening elements are movable in a longitudinal direction of the optics to enable extension of the optics to both sides in the longitudinal direction,
wherein a stepped lens structure is formed on the light exit surface such that light beams are aligned in a direction of a central beam path, and
a recurring surface structure of prominences and deepenings is formed on the light entry surface, the stepped lens structure of the light exit surface is arranged essentially circularly around the central beam path, wherein a lens body extends between the light entry surface and the light exit surface, and wherein the recurring surface structure of the light entry surface is designed in a sinusoidal manner and extends over a two-dimensional region which extends in a plane of the light entry surface in order to compensate for positional differences of a light source relative to the recurring structure, and the lens body extends over the region in the plane of the light entry surface on both sides of the region of the light entry surface.

2. The optics according to claim 1, wherein the light entry surface and the light exit surface are connected by a front connecting wall and a rear connecting wall which are uniformly distanced from one another and define a width of the at least one lens, the prominences and the deepenings are arranged parallel to one another and extend from the front connecting wall to the rear connecting wall, the prominences and the deepenings are arranged across only a portion of a length of the light entry surface.

3. The optics according to claim 1, wherein the prominences and deepenings are arranged uniformly distanced at a distance of less than 1 mm.

4. The optics according to claim 1, wherein the prominences and deepenings from a highest point to a deepest point have a distance of less than 1 mm.

5. The optics according to claim 1, wherein the light entry surface and the light exit surface are connected by two connecting walls which are uniformly distanced from one another.

6. The optics according to claim 5, wherein the two connecting walls have a reflection degree of larger than 90%.

7. The optics according to claim 5, wherein the two connecting walls at least over a part-region of their extension from the light entry surface to the light exit surface, are connected to one another via two planar diverging additional walls which are arranged in a diverging manner from the light entry surface to the light exit surface, and a length of the recurring surface structure is less than a length of the light entry surface which is less than a length of the lens body.

8. The optics according to claim 7, wherein the two diverging walls have a reflection degree of larger than 90%.

9. The optics according to claim 1, wherein the light entry surface comprises a bulging or a deepening which dominates the surface structure, a width of the light entry surface is equal to a width of the light exit surface, a length of the light entry surface is smaller than a length of the lens body, and the recurring surface structure of the light entry surface extends along only a portion of the length of the light entry surface.

10. The optics according to claim 1, comprising at least two lenses are successively arranged along uniformly distanced connecting walls, wherein the light entry surfaces of the at least two lenses are coplanar and spaced from each other by a gap.

11. The optics according to claim 10, wherein the at least two lenses are arranged at a distance from one another, and the distance is at least half a distance from the light entry surface to the light exit surface.

12. The optics according to claim 11, wherein a first lens and a second lens are designed as end lenses.

13. The optics according to claim 10, wherein the at least two lenses are designed as one piece.

14. The optics according to claim 1, wherein at least one fastening element of the plurality of fastening elements is assigned to each lens.

15. The optics according to claim 1, wherein a diffuser is arranged subsequently to the light exit surface.

16. The optics according to claim 15, wherein the diffuser has Lambert-shaped scatter characteristics.

17. The optics according to claim 15, wherein the diffuser is arranged in a diffuser housing and the at least one lens is fastened to the diffuser housing.

18. An illumination device comprising a light source and one or more optics according to claim 1.

19. The illumination device according claim 18, wherein the light source comprises a light module with one or more LEDs which are arranged thereon.

20. The illumination device according to claim 19, wherein an LED is assigned to each lens.

21. The illumination device according to claim 19, wherein each LED is designed as an RGB LED.

22. The optics according to claim 1, wherein the stepped lens structure comprises a Fresnel structure.

23. The optics according to claim 1, wherein the prominences and deepenings, formed on the light entry surface, are periodically arranged.

24. An optics for an illumination device comprising:
an array of lenses formed of a plurality of lenses that are arranged in a longitudinal direction, each of the plurality of lenses of the array has a lens body which has,
- a light entry surface and an opposite light exit surface which are planar and extend parallel to each other in the longitudinal direction, the light entry and the light exit surfaces are substantially perpendicular to a central beam path,
- a first wall and an opposite second wall, the first and the second walls are uniformly spaced from each other in a transverse direction which is perpendicular to the longitudinal direction, the light entry surface and the light exit surface are connected to each other by the first and the second walls, first and second planar diverging walls arranged opposite each other in the longitudinal direction, each of the first and the second diverging walls having a lower edge connected to the light entry surface and extending towards the light exit surface at an angle relative to the central beam path away from each other in the longitudinal direction;

the plurality of lenses being arranged such that longitudinally opposite sides of the lenses are connected to longitudinal sides of adjacent lenses and form the array of lenses, the plurality of lenses being connected such that upper edges of the first diverging walls of one lens are connected to upper edges of the second diverging walls of adjacent lenses;

a plurality of fastening elements comprising one first fastening element and at least one second fastening element, the first fastening element fixes the optics with respect to three axes, the at least one second fastening element fastens the optics relative to the three axes such that the at least one second fastening element is movable in the longitudinal direction to facilitate extension of the optics in the longitudinal direction to both sides;

the light exit surface of each of the plurality of lenses has a stepped lens structure such that light beams are aligned in a direction of the central beam path, the stepped lens structure of the light exit surface is arranged essentially circularly around the central beam path;

the light entry surface of each of the plurality of lenses is aligned with a light source and has a recurring surface structure of prominences and deepenings, and the recurring surface structure is designed in a sinusoidal manner and extends over a two-dimensional region of the light entry surface to compensate for positional differences of the light source relative to the recurring structure, in the longitudinal direction, the region of the light entry surface is arranged centrally on the light entry surface and extends only partially along the light entry surface; and the lens body extends over the region of the light entry surface and beyond opposite sides of the region of the light entry surface in the longitudinal direction.

* * * * *